No. 771,925. PATENTED OCT. 11, 1904.
J. J. O'CONNOR.
AERIAL PUNCHING BAG SUPPORTING BRACKET.
APPLICATION FILED MAR. 3, 1904.
NO MODEL.
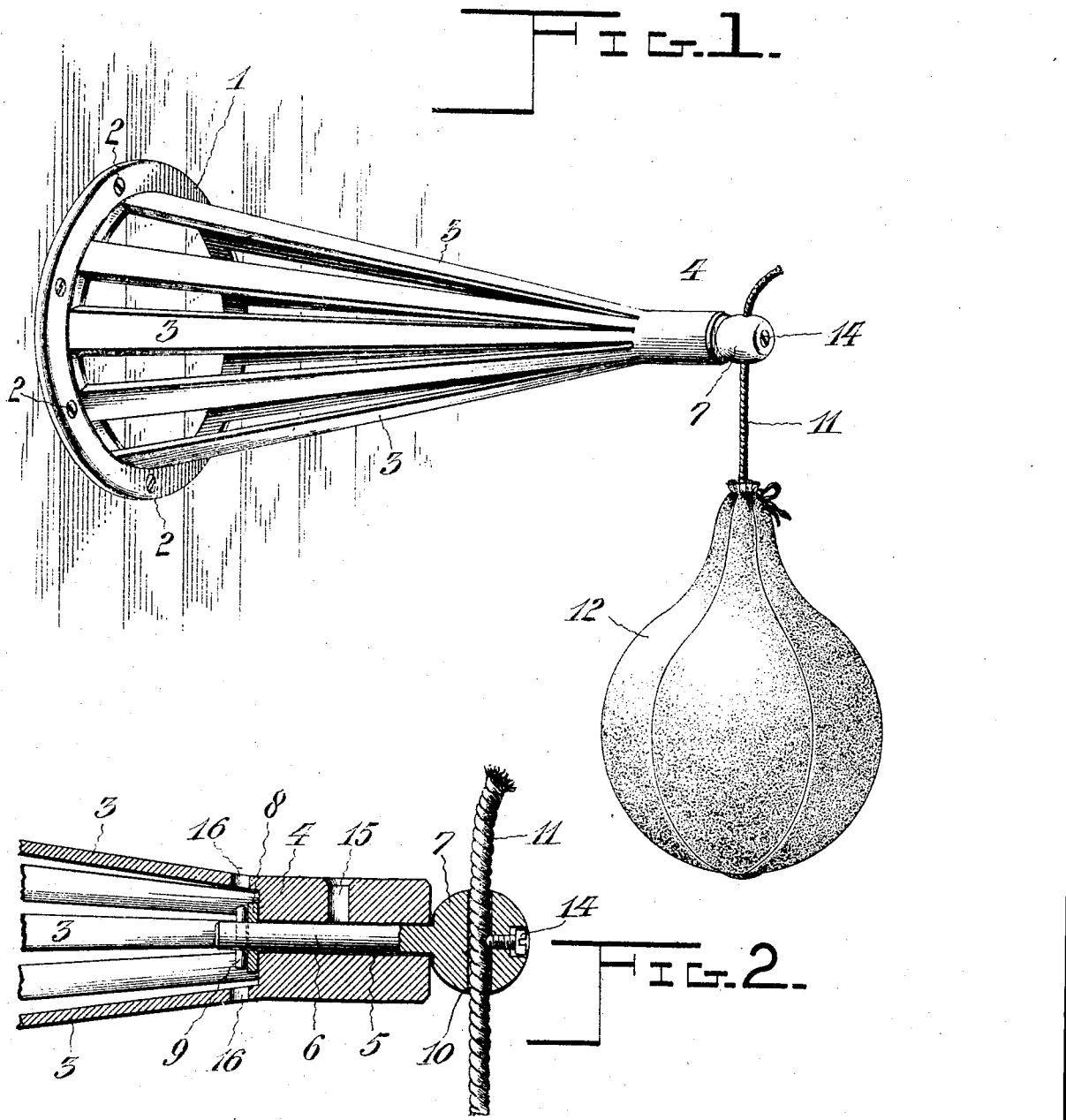
Witnesses: Joseph J. O'Connor, Inventor,
By Marion Marion
Attorneys No. 771,925.

Patented October 11, 1904.

UNITED STATES PATENT OFFICE.

JOSEPH JOHN O'CONNOR, OF MONTREAL, CANADA.

AERIAL-PUNCHING-BAG-SUPPORTING BRACKET.

SPECIFICATION forming part of Letters Patent No. 771,925, dated October 11, 1904.

Application filed March 3, 1904. Serial No. 196,451. (No model.)

*To all whom it may concern:*

Be it known that I, JOSEPH JOHN O'CONNOR, a subject of the King of Great Britain, residing at Montreal, in the county of Hochelaga, Province of Quebec, Canada, have invented certain new and useful Improvements in Aerial-Punching-Bag-Supporting Brackets; and I do hereby declare that the following is a full, clear, and exact description of the invention, such as will enable others skilled in the art to which it appertains to make and use the same.

This invention relates to new and useful improvements in aerial-punching-bag-supporting means, and is especially designed for use in connection with a punching-bag for use in physical culture and for exhibition purposes, the particular feature of the invention which it is desired to protect residing in the construction of the bracket or supporting means and its appurtenant connections used for supporting said punching-bag.

The object of the invention is to provide an economical and durable supporting means whereby a punching-bag may be supported in convenient position for use; and it consists in certain features of novelty in the detail construction, formation, and arrangement of the several parts thereof, all as hereinafter more fully described, and specifically pointed out in the claims.

In the annexed drawings similar numerals of reference indicate corresponding parts in the views, wherein—

Figure 1 is a perspective view of my invention supported upon a wall, and Fig. 2 is a detached fragmentary longitudinal section taken through the supporting-head and swivel used in connection therewith.

Referring to the drawings, 1 is a ring provided with a suitable number of openings through which screws, as 2, may be projected for the purpose of securing the ring in position upon a wall. Preferably cast integral with the ring 1 or otherwise secured thereto in any convenient manner, as may be found desirable, are a plurality of converging arms 3, which project outwardly from the ring 1, as shown in Fig. 1, and terminate in the socketed portion or head 4, which may, if desired, be formed integral with the ring 1 and arms 3, or the said ring 1, arms 3, and head 4 may, if desired, be formed of separate castings or parts suitably connected together. The head 4 is provided with a longitudinally-projecting passage or channel 5, extending entirely through said head, and supported in the channel 5 is a stem 6, provided with an enlargement or head 7, while the nut or washer 8 is slipped upon the inner end of the said stem 6, and a pin, as 9, is provided, the said pin passing through the stem 6 and securing the washer 8 in position thereupon, so that the head 7 and washer 8, with the pin 9, serve as a securing means whereby the stem 6 is properly supported within the head 4 and is freely rotatable therein. The head 7 is also provided with a passage or channel 10, through which may be projected the securing-cord 11, which is connected by any suitable means with the punching-bag 12. To secure the supporting-cord 11 within the head 7, a set-screw 14 is provided, which extends into the head 7 sufficiently far to project into the channel 10 and engage with the supporting-cord 11, whereby the said cord is locked in position within the passage 10, so as to support the bag 12 at any convenient position with relation thereto.

By providing the passage 5 in the head 4 and supporting the punching-bag from the head 7 integral with the stem 5 the head 7 is freely rotatable within the head 4.

Owing to the fact that in use more or less friction may possibly result within the channel 5, the oil-passage 15 is provided in the head 4, through which oil may be passed to lubricate the bearing for the stem 6.

As a bracket of this character will unquestionably be subjected to great strain in use, it is preferred that the ring 1, arms 3, and head 4 comprise a single unitary casting of metal provided with the passage 5, as shown, and to permit seating the pin 9, as shown in Fig. 2, openings 16 are provided between the head 4 and the ring 1, preferably in the arms 3, so that said pin 9 may be inserted through such opening for the purpose of seating it in the inner end of the stem 6.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In a device of the character described, a supporting-bracket comprising means whereby it may be connected with a wall, extensions projecting approximately horizontally therefrom, a substantially horizontally extending passage therein, a swivel supported in said passage, and means whereby a punching-bag may be connected therewith.

2. In a device of the character described, a supporting-bracket comprising a wall-connecting section, a projecting extension and a head provided with a longitudinal passage therein, a stem swiveled in said passage, an enlarged head portion on said stem having a passage extending therethrough, and a set-screw projecting into said passage.

3. In a device of the character described, a bracket adapted to be connected with the vertical face of a wall, said bracket terminating in a head portion, said head portion having a horizontally-extending passage therethrough, a rotatable member supported in said passage, means at the inner end of said member for locking the same in position, and a perforated enlargement upon the opposite end of said member.

4. In a device of the character described, a bracket comprising a ring, outwardly-projecting converging arms, and a head portion, provided with a longitudinally-projected opening, integral therewith, a rotatable stem supported in said opening, means for securing said stem in position, and an enlarged head portion on said stem provided with a plurality of openings adapted respectively as passages for a bag-supporting cord, and a set-screw to hold the same in position.

In witness whereof I have hereunto set my hand in the presence of two witnesses.

JOSEPH JOHN O'CONNOR.

Witnesses:
FREDERICK H. GIBBS,
T. MYNARD.